United States Patent [19]
Shepherd et al.

[11] Patent Number: 5,207,259
[45] Date of Patent: May 4, 1993

[54] FASTENING ASSEMBLY

[76] Inventors: Charles G. Shepherd, 1008 Westdale Road, Oakville, Ontario, Canada, L6L 5A2; D. Bruce Whitehouse, 304 Steeles Avenue East, Milton, Ontario, Canada, L9T 1Y4; Philip W. Davis, 195 Waldencroft Crescent, Burlington, Ontario, Canada, L7L 3A6

[21] Appl. No.: 882,389

[22] Filed: May 13, 1992

[51] Int. Cl.$^5$ .............................................. E06B 9/08
[52] U.S. Cl. .................................... 160/133; 160/190; 160/201
[58] Field of Search ................. 160/133, 190, 201, 193

[56] References Cited

U.S. PATENT DOCUMENTS

| | | | |
|---|---|---|---|
| 967,757 | 8/1910 | Glandon | 160/193 X |
| 2,934,139 | 4/1960 | Wardlaw et al. | 160/133 X |
| 3,019,450 | 2/1962 | Karasiewicz | 160/133 X |
| 3,894,571 | 7/1975 | Hinchliff | 160/201 |
| 4,124,055 | 11/1978 | Aspenson et al. | 160/193 |

FOREIGN PATENT DOCUMENTS 1449461 9/1976 United Kingdom.
1566257 4/1980 United Kingdom.

OTHER PUBLICATIONS

Publication: Aluminum Roller Shutters for Commercial Vehicles Published by: Weiland-Werke, not dated.
Publication: NYLOY 30, Published by Dover Roller Shutters, not dated.
Publication: Robinson Aluminum Shutters, Robinson Shutters, not dated.

*Primary Examiner*—David M. Purol
*Attorney, Agent, or Firm*—Rogers & Scott

[57] ABSTRACT

The invention provides a roll-up door for operation with a pre-tensioned balancer and having fastening apparatus comprising a cable with fasteners, one on each end, and which is coupled to the door at first and second positions spaced substantially equally from respective sides of the door. The balancer has a clip located centrally with respect to the first and second positions so that as the cable is positioned on the balancer during initial installation, the cable can adjust in the clip so that the lengths of the cable from the balancer to the door are equalized. The cable is wound onto the balancer as the door is opened. This winding creates sufficient friction between the cables and the balancer to lock the cables to the balancer so that the cables effectively retain their equal lengths during use.

9 Claims, 4 Drawing Sheets

FASTENING ASSEMBLY

This invention relates to roll-up doors made up of parallel slats which are attached to one another and which ride in parallel tracks. More particularly the invention is related to the connection between the slats and a pre-tensioned balancer which exerts a winding force to assist the door in moving from a closed to an open position.

Roll-up doors are commonly installed to close compartments in a truck such as a fire truck. Typically, the door slides in parallel tracks at the vertical edges of the compartment so that the door is lifted to open it. As the door opens it flexes between slats so that it rolls over an idler at the top of the compartment. The door is drawn by a pair of cables which pull the door over the idler and on to be stored either in a horizontal position beneath the ceiling of the compartment, or wrapped around the pre-tensioned balancer. In either case the cables must wrap about the balancer.

Upon installation or repair of the door, it is desirable for the aforementioned cables to be easily fastened to or released from the door or the balancer. Also, the cables must be positioned so both apply equal pulling forces to keep the door aligned when sliding in the tracks. Even minor misalignment will result in increased friction and possible binding.

Prior art systems generally provide two independent cables or straps, one at each end of the balancer. This arrangement provides the required stability when lifting the door but demands that the cables or straps be of precisely equal length to maintain alignment of the door. This often leads to significant problems because the installer has to work in a very confined space.

The aforementioned requirements lead to time consuming measurements and cable cutting. To reduce this problem, prior art straps have been made from modular hinged elements to ensure equal lengths. In addition, British Patent Publication No. 1,566,257 to Dover Roller Shutters Limited discloses ratcheted drums so the cables can be adjusted to the proper lengths. While such prior art devices may provide a solution, the products are relatively complicated and expensive to manufacture and install.

Consequently, it is among the objects of this invention to provide a roll-up door having an improved fastening apparatus that simply and inexpensively fastens the door to a pre-tensioned balancer to assist in lifting the door.

Accordingly in one of its aspects, the invention provides a roll-up door for operation with a pre-tensioned balancer and having fastening apparatus comprising a cable with fasteners, one on each end, and which is coupled to the door at first and second positions spaced substantially equally from respective sides of the door. The balancer has a clip located centrally with respect to the first and second positions so that as the cable is positioned on the balancer during initial installation, the cable can adjust in the clip so that the lengths of the cable from the balancer to the door are equalized. The cable is wound onto the balancer as the door is opened. This winding creates sufficient friction between the cables and the balancer to lock the cables to the balancer so that the cables effectively retain their equal lengths during use.

In another of its aspects the balancer has several clips spaced substantially symmetrically to share in the load applied by the cable from the weight of the door and to also allow the cable to equalize in the clips.

These and other aspects of the invention will be more fully understood with reference to the following description and drawings, in which:

FIG. 1 a cut-away perspective view with parts exploded to show a roll-up door installed in a compartment of a truck, the door being in a closed position with a fastening apparatus connecting the door to a balancer according to a preferred embodiment of the invention;

Figure 1:
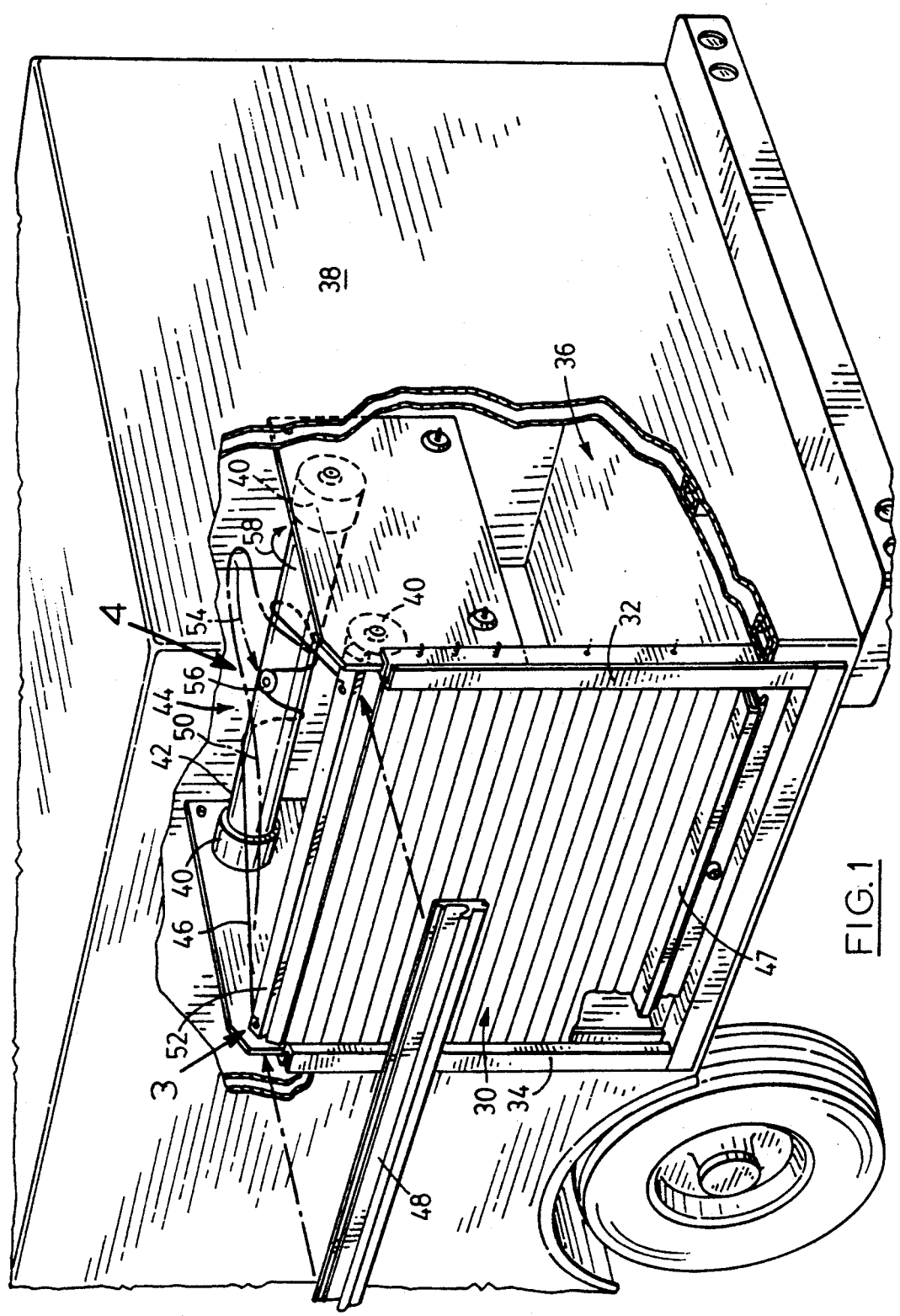

Reference is made firstly to FIG. 1 which illustrates a roll-up door 30 which can be moved in tracks 32, 34 to open or close a compartment 36 in a truck 38. Here, the door is shown in a closed position.

In this embodiment, as the door 30 is lifted, it rolls over an idler 40 and around a pre-tensioned balancer 42. Fastening apparatus, represented generally by the numeral 44, connects the door 30 with the balancer 42 thus providing simple installation as well as saving the cost and weight of continuing the door from the idler 40 to the balancer 42. The balancer 42 is pre-tensioned to help lift the door by winding a cable 46 of the fastening apparatus 44 thereby exerting a pulling force on the door 30.

Figure 2:
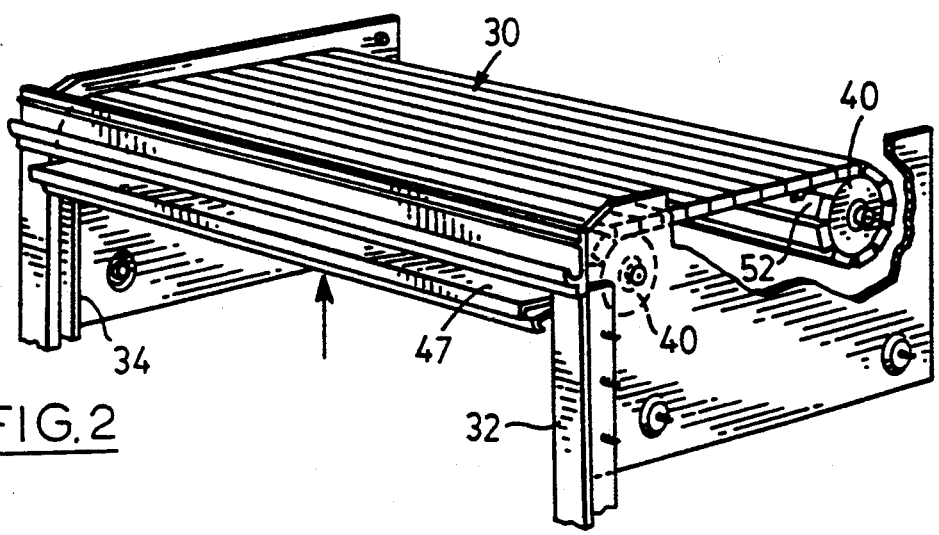
FIG. 2 is a simplified perspective view of the door rolled up around the balancer and in an open position.

In operation, the door can be lifted using a handle 47 to an open position as shown in FIG. 2 where the handle 47 stops at a gutter 48. Here, both the cable 46 (hidden under the door) and the door 30 are wound on the balancer 42. The door 30 can then be pulled downwardly to the closed position shown in FIG. 1 thus unwinding the door 30 and cable 46 from the balancer 42.

To install the fastening apparatus 44, a slack cable 50 (shown in chain-dotted line in FIG. 1) is fastened at both ends to a top slat 52 of the door 30 as will be described with respect to FIG. 3. The cable 50 is looped following arrow 54 onto a clip 56 attached to the pre-tensioned balancer 42. Description of the clip 56 will follow with reference to FIG. 4, but for now, it is sufficient to know that the cable 50 is slidably engaged in the clip 56. Consequently, the cable can be positioned so that when the force of the pre-tensioned balancer 42 winds the cable 50 (following arrow 58) around the balancer 42, the cable 50 initially equalizes in the clip 56, and as wrapping continues the friction between the cable and the balancer effectively binds the cable on the balancer. Sufficient wrap turns are provided during initial assembly to ensure this binding is maintained at all times during door use. The portion of cable shown as 46 is in tension with the door closed and the wrap on the balancer ensures this lock.

In the aforementioned tensioned position, the lengths of cable 46 from the door 30 to the balancer 42 are equalized and provide a balanced resultant force on the door 30. This is due to the geometry of the fastening apparatus 44 and will be described with respect to FIG. 5. The pre-tensioned winding force of the balancer 42 and thus the resultant force through the cable 46 onto the door 30, is typically equal to the force from the weight of the door 30. Thus the balancer 42 balances the weight making the door 30 easy to lift when opening the compartment 36.

Figure 3:
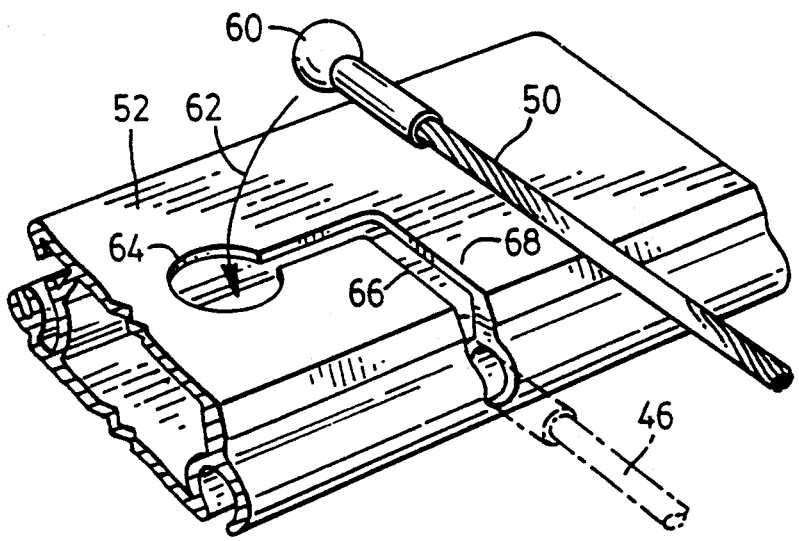
FIG. 3 is simplified perspective view (to a larger scale) along arrow 3 of FIG. 1 and showing the fastening of an end of a cable to the door.

Referring next to FIG. 3, the fastening of one end of the cable 50 to the top slat 52 of the door 30 is shown. A similar fastening is provided at the other end. It can be seen that the cable 50 has head 60 which can be swaged or held on the cable in any number of common ways. The head 60 is inserted following arrow 62 into a hole 64 and along an L-shaped keep 66 to be retained underneath a top plate 68 of the slat 52.

Figure 4:
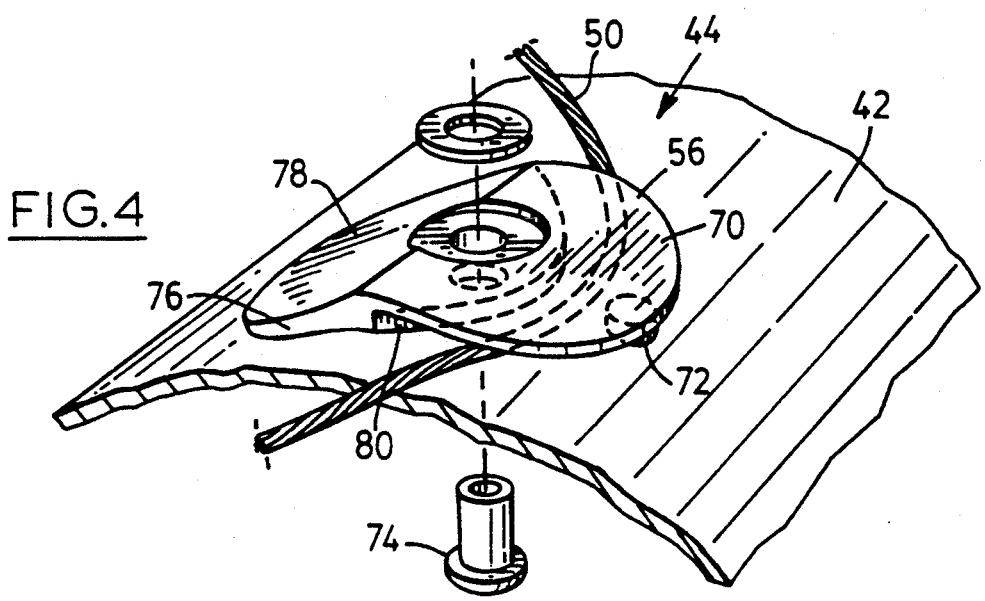
FIG. 4 is simplified perspective view along arrow 4 of FIG. 1 (also to a larger scale) and showing the cable slidably engaged in a clip on the balancer.

FIG. 4 shows the cable 50 slidably engaged in the clip 56. The clip is attached by a rivet 74 and has a flexible lip 70 with a nib 72 protruding towards the balancer 42. This flexibility permits lip 70 to be lifted to permit the cable 50 to be entered past the nib 72. The cable is then retained by the nib 72 to prevent accidental disengagement during installation.

A top face 78 of the clip base 76 is sloped downwardly, as drawn, to facilitate smooth winding of the door 30 around the balancer 42. When the balancer 42 winds the cable 50, the cable slides on a curved base surface 80 until it is equalized as described in the following paragraphs.

Figure 5:
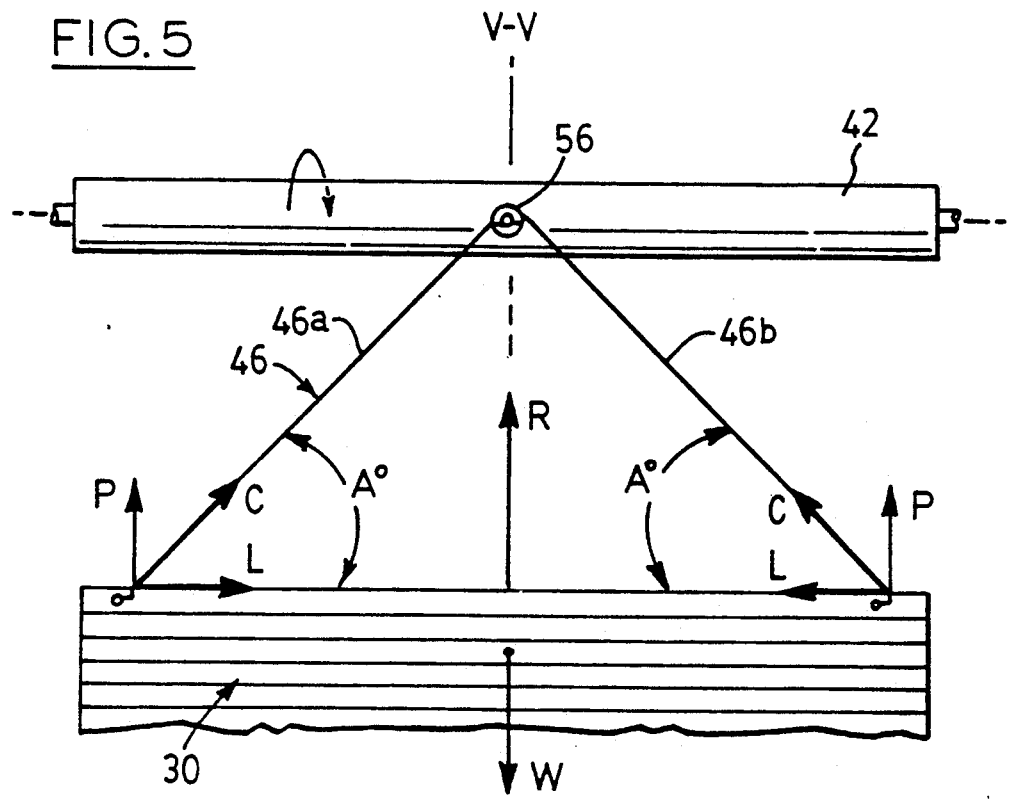
FIG. 5 is a schematic top view showing the forces involved in pulling the door with the fastening apparatus according to the invention.

FIG. 5 is a schematic drawing which will be used to describe in simple terms, the forces on the door 30. Firstly, as the assembly takes place, there is a force W which is created by gravity pulling down on the weight of the door 30. This acts through the center of gravity of the door 30 which is on the vertical plane V—V perpendicular to the door 30. The force is directed by the idler 40 (not shown) to pull along arrow W as shown.

Secondly, there is the winding force in the pre-tensioned balancer 42 which pulls the cable 46 with a cable tension C. This is equal on two arms 46a and 46b of the cable 46 because the cable 46 is slidably engaged in the clip 56. The plane V—V for most installations passes through the mid-point of the balancer 42 so that the clip 56 would commonly be positioned at the mid-point of the balancer 42.

The ends of the cable 46 are fastened to the door 30 equally spaced from the clip 56, and in practice, from the sides of the door. This results in equal angles A between the cable 46 and the top of the door 30 as well as equal vertical (as drawn) components P of the cable tension C which together equal a resultant force R on the plane V—V which is equal and opposite to the weight force W. It will be evident that if the symmetry of the cable fastening or the clip 56 is moved off the plane V—V then either or both a tilting moment and resultant lateral force will occur. These undesirable forces would have to be resisted by the engagement between the door and the track with resultant wear and possible binding.

Figure 6:
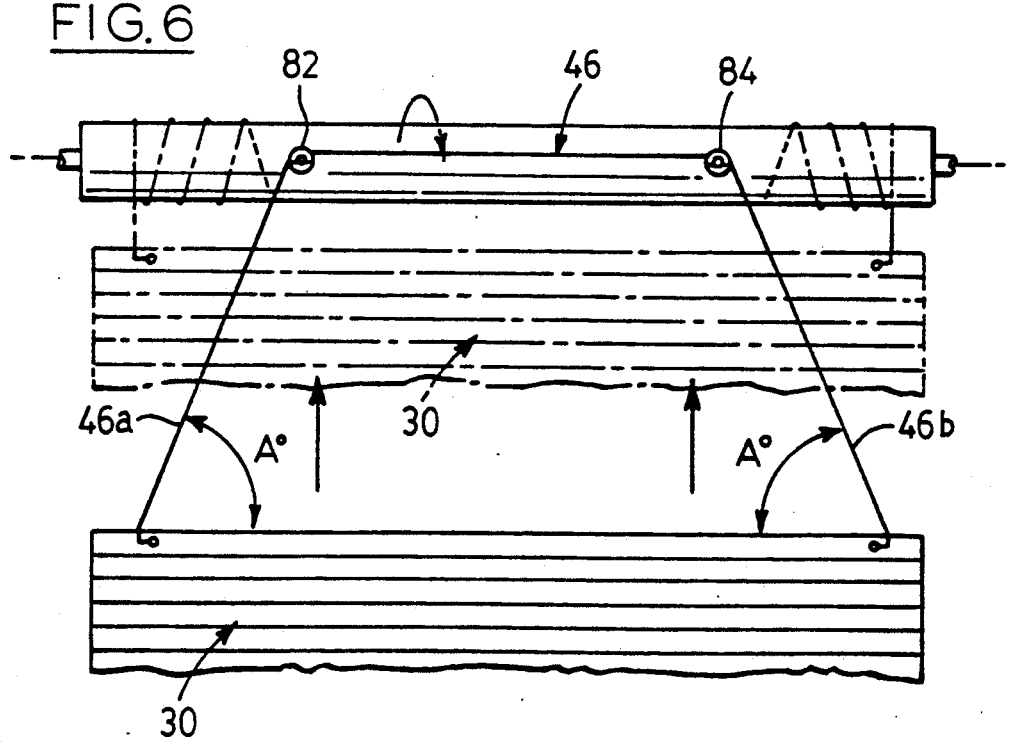
FIG. 6 is a view similar to FIG. 5 of a second embodiment of the invention which includes several clips.

FIG. 6 shows a second embodiment having several clips used to share the load of the cable tension. The clips 82, 84 must be arranged symmetrically with respect to the cable attachments to the door so that no lateral forces or tilting moments are produced in the door.

The angle A should be less than about 80 degrees so that when wound on the balancer 42, the cable windings will not cross or lap. A final cable winding position is shown in chain-dotted line in FIG. 6 after moving the door 30 to a position indicated in ghost outline. It should be noted that since the arms 46a, 46b of the cable 46 are equal in length and angle, when the door 30 reaches the balancer 42 it is parallel with the balancer 42 as long as they were set up to start off parallel.

Figure 7:
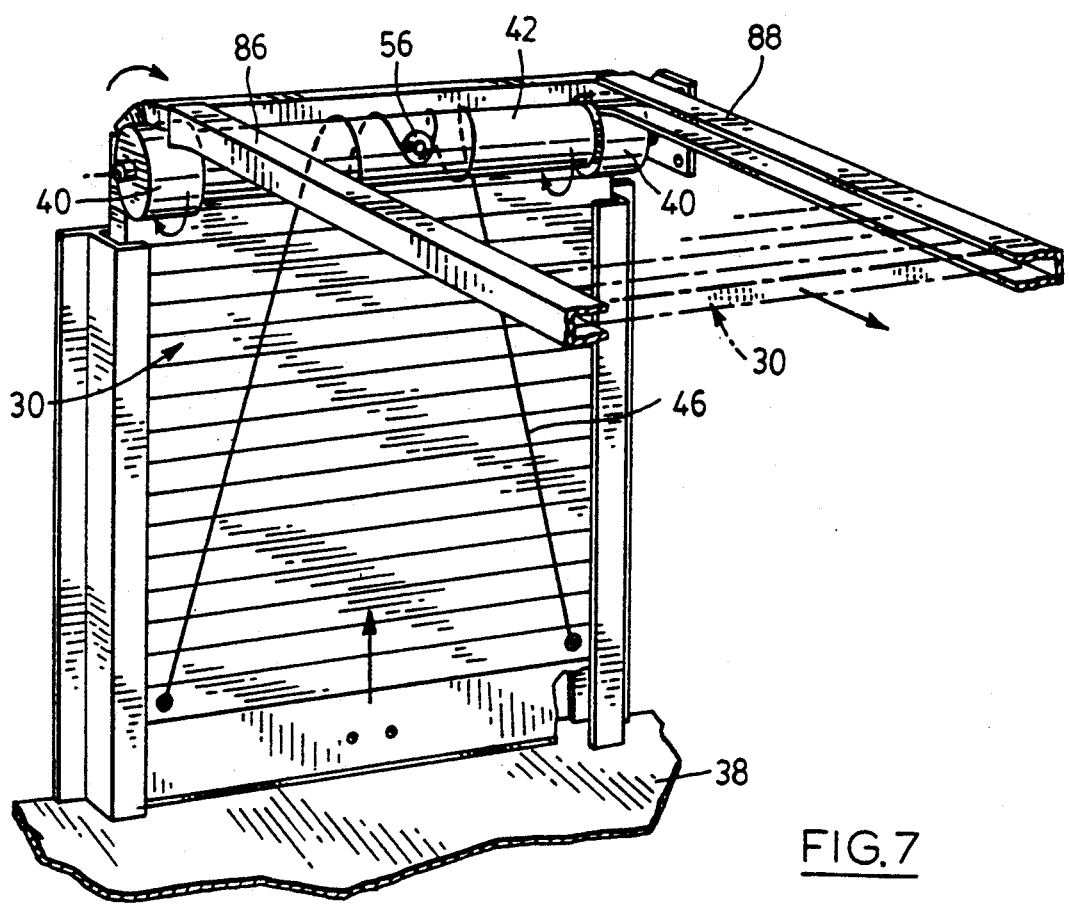
FIG. 7 is simplified perspective view from the back of the door showing a third embodiment of the invention where the cable is fastened to the bottom of the door.

In a third embodiment of the invention, as shown in FIG. 7, the cable 46 is fastened to the bottom of the back of the door 30. This can be done using a similar fastening arrangement to that shown in FIG. 3 or an eye and hook or other common means. The cable 46 is then wound around the balancer 42 which has idler wheels 40 on the same shaft. This raises the door 30 up from the balancer 42 so that the cable 46 has clearance to wind.

As the cable 46 winds and the door 30 is lifted, the door 30 slides in guides 86, 88 to a position under the ceiling of the cabinet (not shown). This is represented by the ghost outline drawn between the guides 86, 88. The guides 86, 88 may be tracks or rollers and can direct the door in various desired directions. Again, in this embodiment two or more symmetrically located clips can be used on the balancer to share the pulling load.

While the invention is shown as being installed in a side opening compartment in a truck, the invention could of course be installed to cover any opening such as a rear opening compartment in a truck. It is also evident that the fastening of the cable to the door could be of various type such as hooks or screws. The preferred embodiment described, however, allows for quick and easy unfastening yet avoids accidental unfastening. These and other variations are within the scope of the invention as claimed.

We claim:

1. In a roll-up door assembly for sliding in tracks and having a pre-tensioned balancer and a fastening apparatus to couple the door to the balancer, the fastening apparatus comprising:
   a cable having two ends, the ends being fastenable to the door at first and second positions;
   clip means in which the cable is slidably engageable, the clip means being coupled to the pre-tensioned balancer and substantially equally spaced from said first and second positions so that as tension is applied to the cable via the door during installation the cable will adjust in the clip means to maintain the spacing between the clip and said first and second positions.

2. Apparatus as claimed in claim 1 wherein said two ends of the cable are fastened substantially at the top of the door so that as the cable is wound by the pre-tensioned balancer, the door is pulled by the cable to wind around said pre-tensioned balancer.

3. Apparatus as claimed in claim 1 wherein said two ends of the cable are releaseably fastened substantially at the bottom of the door so that the cable is wound by the pre-tensioned balancer, the door is pulled by the cable onto guides above said pre-tensioned balancer.

4. Apparatus as claimed in claim 1 wherein the clip means includes a base fastened to said pre-tensioned balancer, the base having a curved surface on which the cable slides, a flexible lip, and a nib under the lip to position the cable under the lip.

5. Apparatus as claimed in claim 1 wherein said two ends of the cable have respective heads having a diameter larger than that of the cable, the heads being inserted through respective holes in the door and along respective L-shaped keeps to releaseably fasten the cable to the door.

6. A roll-up door assembly for closing an opening having parallel sides, the door assembly comprising:

parallel track means positioned at the sides of the opening;

a plurality of slats hingeably coupled to one another to form a door and including means for slidably engaging the door in the track means for movement between a closed position and an open position;

an idler positioned at an end of the track means for receiving and guiding the door as it is moved between said positions;

a balancer parallel to the idler and mounted for rotation, the balancer including biasing means;

an elongate flexible element coupling one of the slats to the balancer, the element being attached to said one of the slats at two points adjacent respective ends of the slat; and attachment means coupled to the balancer and slidably receiving the flexible element to permit the element to be positioned relative to the balancer and said one of the slats, so that on assembly the element will wrap around the balancer and provide substantially equal loadings on the slat at said two points whereby the door will ride smoothly in the tracks as the door is moved between said positions.

7. An assembly as claimed in claim 6 in which said one of the slats is the slat nearest the idler when the door is in the closed position.

8. An assembly as claimed in claim 7 in which said one of the slats is the slat farthest away from the idler when the door is in the closed position.

9. An assembly as claimed in claim 6 in which said element is a steel cable.

* * * * *